(12) United States Patent
Han et al.

(10) Patent No.: US 10,917,149 B2
(45) Date of Patent: Feb. 9, 2021

(54) PARAMETER INDICATION AND DETERMINING METHODS, RECEIVE DEVICE, AND TRANSMIT DEVICE

(71) Applicant: HUAWEI TECHNOLOGIES CO., LTD., Shenzhen (CN)

(72) Inventors: Wei Han, Shanghai (CN); Lu Wu, Shenzhen (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/506,995

(22) Filed: Jul. 9, 2019

(65) Prior Publication Data

US 2019/0334592 A1    Oct. 31, 2019

Related U.S. Application Data

(63) Continuation of application No. PCT/CN2018/071284, filed on Jan. 4, 2018.

(30) Foreign Application Priority Data

Jan. 9, 2017   (CN) .......................... 2017 1 0015118

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC ... H04B 7/0456; H04B 7/0478; H04B 7/0617
See application file for complete search history.

(56) References Cited

U.S. PATENT DOCUMENTS 7,330,507 B2 *  2/2008  Levasseur .............. H04B 7/088
                                                              375/232
9,246,571 B2 *  1/2016  Wang .................... H04B 7/043
(Continued)

FOREIGN PATENT DOCUMENTS

CN        101674140 A    3/2010
CN        102413077 A    4/2012
(Continued)

OTHER PUBLICATIONS

Intel Corporation: "Specification impact for non-coherent JT", 3GPP TSG RAN WG1 Meeting #87, R1-1611954, Reno, USA Nov. 14-18, 2016, total 4 pages.
(Continued)

*Primary Examiner* — James M Perez
(74) *Attorney, Agent, or Firm* — Kilpatrick Townsend & Stockton LLP (57) ABSTRACT

Embodiments of the present application provide a parameter indication method and parameter determining method, a receive device, and a transmit device. The parameter indication method includes: generating indication information for each of a plurality of antenna panels, where the indication information is used to indicate an adjustment parameter of the antenna panel, and the adjustment parameter includes at least one of an amplitude adjustment parameter and a phase adjustment parameter; and sending the indication information. The embodiments of the present application further provide a parameter determining method, a receive device, and a transmit device. In the technical solutions provided in the embodiments of the present application, adjustment parameters of the plurality of antenna panels are fed back to adjust the plurality of antenna panels, so that a precoding vector constructed based on the plurality of antenna panels is more accurate.

16 Claims, 5 Drawing Sheets

(56) References Cited

U.S. PATENT DOCUMENTS

| | | | | |
|---|---|---|---|---|
| 9,813,269 | B1* | 11/2017 | Yoon | H04B 1/40 |
| 9,941,917 | B2* | 4/2018 | Wang | H04W 52/00 |
| 10,020,865 | B2* | 7/2018 | Mu | H01Q 3/40 |
| 10,181,964 | B2* | 1/2019 | Yum | H04L 25/0204 |
| 10,270,499 | B2* | 4/2019 | Zhang | H04B 7/0413 |
| 10,374,768 | B2* | 8/2019 | Harrison | H04B 7/0421 |
| 10,439,663 | B2* | 10/2019 | Islam | H04L 1/0009 |
| 10,469,146 | B1* | 11/2019 | Ekbatani | H04B 7/0456 |
| 10,574,308 | B2* | 2/2020 | Wernersson | H04B 7/0473 |
| 10,581,503 | B2* | 3/2020 | Chang | H04B 7/0413 |
| 10,797,810 | B2* | 10/2020 | Ghanbarinejad | H04B 7/0691 |
| 2012/0306697 | A1* | 12/2012 | Kimura | H04B 17/21 342/368 |
| 2013/0017836 | A1* | 1/2013 | Chang | H01Q 1/1257 455/452.1 |
| 2013/0315287 | A1* | 11/2013 | Comic | H01Q 3/02 375/224 |
| 2016/0080052 | A1* | 3/2016 | Li | H04L 5/005 375/267 |
| 2016/0198347 | A1* | 7/2016 | Zhan | H04B 1/40 455/23 |
| 2016/0198523 | A1* | 7/2016 | Wang | H04B 1/38 455/561 |
| 2016/0291148 | A1* | 10/2016 | Ellenbogen | H01Q 21/293 |
| 2017/0005712 | A1* | 1/2017 | Jiang | H04B 7/065 |
| 2017/0237477 | A1* | 8/2017 | Fujio | H04W 16/28 370/329 |
| 2017/0338879 | A1* | 11/2017 | Hessler | H04B 7/0456 |
| 2018/0041973 | A1* | 2/2018 | Faxer | H04B 7/0697 |
| 2018/0102817 | A1* | 4/2018 | Park | H04B 7/06 |
| 2018/0198510 | A1* | 7/2018 | Park | H04B 7/0628 |
| 2018/0212800 | A1* | 7/2018 | Park | H04B 7/0626 |
| 2018/0220448 | A1* | 8/2018 | Akkarakaran | H04W 16/28 |
| 2018/0262313 | A1* | 9/2018 | Nam | H04L 5/005 |
| 2018/0310283 | A1* | 10/2018 | Deenoo | H04W 72/046 |
| 2018/0331727 | A1* | 11/2018 | John Wilson | H04B 7/0413 |
| 2018/0343046 | A1* | 11/2018 | Park | H04B 7/0626 |
| 2019/0109626 | A1* | 4/2019 | Park | H04L 1/0026 |
| 2019/0109749 | A1* | 4/2019 | Bai | H04L 5/0048 |
| 2019/0132828 | A1* | 5/2019 | Kundargi | H04W 72/1205 |
| 2019/0149299 | A1* | 5/2019 | Lee | H04B 7/0456 370/329 |
| 2019/0166610 | A1* | 5/2019 | Lee | H04W 72/1268 |
| 2019/0181921 | A1* | 6/2019 | Lee | H04B 7/06 |
| 2019/0181934 | A1* | 6/2019 | Kang | H04W 72/0406 |
| 2019/0199406 | A1* | 6/2019 | Wang | H04W 72/046 |
| 2019/0207722 | A1* | 7/2019 | Gao | H04B 7/088 |
| 2019/0230545 | A1* | 7/2019 | Liou | H04W 16/28 |
| 2019/0260453 | A1* | 8/2019 | Huang | H04B 7/0617 |
| 2019/0261329 | A1* | 8/2019 | Park | H04B 7/08 |
| 2019/0312623 | A1* | 10/2019 | Park | H04B 7/0456 |
| 2019/0319680 | A1* | 10/2019 | Zhang | H04B 7/0617 |
| 2019/0334592 | A1* | 10/2019 | Han | H04B 7/0617 |
| 2019/0341981 | A1* | 11/2019 | Park | H04B 7/0639 |
| 2019/0349063 | A1* | 11/2019 | Takano | H04B 7/024 |
| 2019/0363760 | A1* | 11/2019 | Wu | H04B 7/0456 |
| 2020/0028563 | A1* | 1/2020 | Gao | H04L 1/00 |
| 2020/0059398 | A1* | 2/2020 | Pan | H04W 72/0413 |
| 2020/0083938 | A1* | 3/2020 | Park | H04B 7/0486 |
| 2020/0083943 | A1* | 3/2020 | Rahman | H04B 7/0639 |
| 2020/0106504 | A1* | 4/2020 | Noh | H04B 7/0626 |
| 2020/0107341 | A1* | 4/2020 | Zhang | H04W 72/042 |
| 2020/0119788 | A1* | 4/2020 | Huang | H04B 7/0469 |
| 2020/0136711 | A1* | 4/2020 | Cao | H04B 7/0408 |
| 2020/0153488 | A1* | 5/2020 | Wu | H04B 7/0417 |
| 2020/0169304 | A1* | 5/2020 | Chen | H04W 72/046 |
| 2020/0204224 | A1* | 6/2020 | Kang | H04B 7/0456 |
| 2020/0204239 | A1* | 6/2020 | Kang | H04B 7/0456 |
| 2020/0212974 | A1* | 7/2020 | Wu | H04B 7/0634 |
| 2020/0336182 | A1* | 10/2020 | Faxer | H04B 7/065 |

FOREIGN PATENT DOCUMENTS

| | | |
|---|---|---|
| CN | 103814529 A | 5/2014 |
| WO | 2016122393 A1 | 8/2016 |

OTHER PUBLICATIONS

Huawei et al., "Codebook design for multi-panel structured MIMO in NR", 3GPP TSG RAN WG1 Meeting #87, R1-1611666, Reno, US, Nov. 14-18, 2016, total 6 pages.

* cited by examiner

PARAMETER INDICATION AND DETERMINING METHODS, RECEIVE DEVICE, AND TRANSMIT DEVICE

CROSS-REFERENCE TO RELATED APPLICATIONS

This application is a continuation of International Application No. PCT/CN2018/071284, filed on Jan. 4, 2018, which claims priority to Chinese Patent Application No. 201710015118.5, filed on Jan. 9, 2017, The disclosures of the aforementioned applications are hereby incorporated by reference in their entireties.

TECHNICAL FIELD

The present application relates to the field of communications technologies, and in particular, to parameter indication and determining methods, a receive device, and a transmit device.

BACKGROUND

Emergence of a multiple-input multiple-output (MIMO) technology brings a revolutionary change to wireless communication. In the MIMO technology, a plurality of antennas may be deployed on a transmit device and a receive device, to significantly improve performance of a wireless communications system. For example, in a diversity scenario, the MIMO technology can effectively improve transmission reliability; and in a multiplexing scenario, the MIMO technology can increase a transmission throughput manyfold.

In a MIMO system, a precoding technology is usually used to improve a channel, so as to improve a spatial multiplexing effect. Specifically, the precoding technology uses a precoding matrix that matches the channel to process a data flow obtained after spatial multiplexing (briefly referred to as a spatial flow below), so as to precode the channel, improving receiving quality of the spatial flow.

The precoding matrix usually includes a plurality of column vectors, each column vector may also be referred to as a precoding vector, and each precoding vector is used to precode a spatial flow. In the prior art, the precoding vector is usually fed back based on a codebook, and the precoding vector is constructed by using a linear combination of a plurality of column vectors in the codebook. The foregoing precoding vector construction scheme is usually specific to a single antenna panel. In other words, a terminal device is served by a single antenna panel. When the terminal device is served by a plurality of antenna panels at the same time, the plurality of antenna panels may be considered as one virtual antenna panel, and the precoding vector is constructed based on the foregoing construction scheme. However, usually, there is a difference between different antenna panels. Therefore, the virtual panel constructed by combining the antenna panels cannot be simply considered as a single antenna panel that is obtained after scale expansion. As a result, it is difficult to ensure accuracy of the precoding vector that corresponds to the plurality of antenna panels and that is determined based on the precoding vector construction scheme designed for the single antenna panel.

SUMMARY

To improve accuracy of a precoding vector applied to a plurality of antenna panels, embodiments of the present application provide parameter indication and determining methods, a receive device, and a transmit device. The technical solutions are as follows.

According to a first aspect, a parameter indication method is provided, where the method includes:

generating indication information for each of a plurality of antenna panels, where the indication information is used to indicate an adjustment parameter of the antenna panel, and the adjustment parameter includes at least one of an amplitude adjustment parameter and a phase adjustment parameter; and sending the indication information.

According to the parameter indication method provided in this embodiment of the present application, the indication information is generated and sent, where the indication information is used to indicate a parameter of each of the plurality of antenna panels, and the parameter includes at least one of an amplitude and a phase, so that a transmit device determines the parameter of the antenna panel corresponding to the indication information based on the indication information. In the technical solution provided in this embodiment of the present application, adjustment parameters of the plurality of antenna panels are fed back to adjust the plurality of antenna panels, so that a precoding vector constructed based on the plurality of antenna panels is more accurate.

In a possible design, the adjustment parameter of each antenna panel is generated based on a result of comparison between channel information corresponding to the antenna panel and channel information corresponding to a reference antenna panel.

In a possible design, the adjustment parameter is used to adjust the antenna panel corresponding to the adjustment parameter when the antenna panel is combined with another antenna panel.

In a possible design, a value of the amplitude adjustment parameter is selected from an amplitude value set.

In a possible design, a value of the phase adjustment parameter is selected from a phase value set.

In a possible design, the indication information is sent by using a precoding matrix indicator.

According to a second aspect, a parameter determining method is provided, where the method includes:

receiving indication information that is generated for each of a plurality of antenna panels, where the indication information is used to indicate an adjustment parameter of the antenna panel, and the adjustment parameter includes at least one of an amplitude adjustment parameter and a phase adjustment parameter; and determining the adjustment parameter corresponding to the antenna panel based on the indication information.

According to the parameter determining method provided in this embodiment of the present application, the indication information is received, where the indication information is used to indicate the adjustment parameter of each of the plurality of antenna panels, and the adjustment parameter includes at least one of the amplitude adjustment parameter and the phase adjustment parameter. A transmit device determines the adjustment parameter of the antenna panel corresponding to the indication information based on the indication information. In the technical solution provided in this embodiment of the present application, adjustment parameters of the plurality of antenna panels are determined to adjust the plurality of antenna panels, so that a precoding vector constructed based on the plurality of antenna panels is more accurate.

In a possible design, the adjustment parameter of each antenna panel is generated based on a result of comparison between channel information corresponding to the antenna panel and channel information corresponding to a reference antenna panel.

In a possible design, the adjustment parameter is used to adjust the antenna panel corresponding to the adjustment parameter when the antenna panel is combined with another antenna panel.

In a possible design, a value of the amplitude adjustment parameter is selected from an amplitude value set.

In a possible design, a value of the phase adjustment parameter is selected from a phase value set.

In a possible design, the indication information is sent by using a precoding matrix indicator.

According to a third aspect, a receive device is provided, where the receive device includes:

a generation module, configured to generate indication information for each of a plurality of antenna panels, where the indication information is used to indicate an adjustment parameter of the antenna panel, and the adjustment parameter includes at least one of an amplitude adjustment parameter and a phase adjustment parameter; and a sending module, configured to send the indication information.

In a possible design, the adjustment parameter of each antenna panel is generated based on a result of comparison between channel information corresponding to the antenna panel and channel information corresponding to a reference antenna panel.

In a possible design, the adjustment parameter is used to adjust the antenna panel corresponding to the adjustment parameter when the antenna panel is combined with another antenna panel.

In a possible design, a value of the amplitude adjustment parameter is selected from an amplitude value set.

In a possible design, a value of the phase adjustment parameter is selected from a phase value set.

In a possible design, the indication information is sent by using a precoding matrix indicator.

According to a fourth aspect, a transmit device is provided, where the transmit device includes:

a receiving module, configured to receive indication information that is generated for each of a plurality of antenna panels, where the indication information is used to indicate an adjustment parameter of the antenna panel, and the adjustment parameter includes at least one of an amplitude adjustment parameter and a phase adjustment parameter; and a determining module, configured to determine the adjustment parameter corresponding to the antenna panel based on the indication information.

In a possible design, the adjustment parameter of each antenna panel is generated based on a result of comparison between channel information corresponding to the antenna panel and channel information corresponding to a reference antenna panel.

In a possible design, the adjustment parameter is used to adjust the antenna panel corresponding to the adjustment parameter when the antenna panel is combined with another antenna panel.

In a possible design, a value of the amplitude adjustment parameter is selected from an amplitude value set.

In a possible design, a value of the phase adjustment parameter is selected from a phase value set.

In a possible design, the indication information is sent by using a precoding matrix indicator.

The technical solutions provided in the embodiments of the present application have the following beneficial effects:

According to the parameter indication and determining methods, the receive device, and the transmit device that are provided in the embodiments of the present application, the adjustment parameter of each of the plurality of antenna panels is generated and indicated to the transmit device, so that the transmit device may adjust the antenna panel. The foregoing adjustment helps narrow a difference between different antenna panels that are combined, thereby improving accuracy of a precoding vector.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

The technical solutions provided in the embodiments of the present application are described in detail below with reference to the accompanying drawings.

Figure 1:
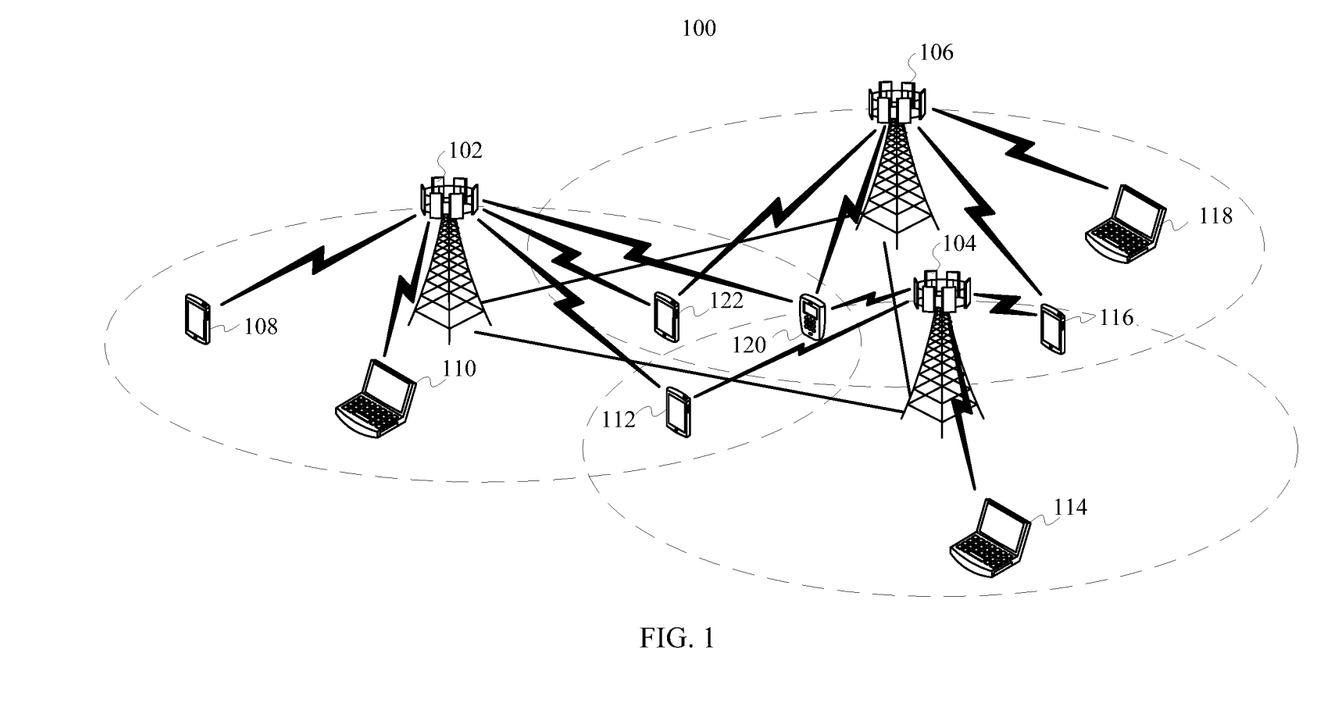
FIG. 1 is an example schematic diagram of a wireless communications network according to an embodiment of the present application.

FIG. 1 is an example schematic diagram of a wireless communications network 100 according to an embodiment of the present application. As shown in FIG. 1, the wireless communications network 100 includes base stations 102, 104, and 106 and terminal devices 108, 110, 112, 114, 116, 118, 120, and 122. The base stations 102, 104, and 106 may communicate with each other by using backhaul links (as shown by straight lines between the base stations 102, 104, and 106). The backhaul links may be wired backhaul links (for example, optical fibers and copper cables), or may be wireless backhaul links (for example, microwaves). The terminal devices 108, 110, 112, 114, 116, 118, 120, and 122 may communicate with the corresponding base stations 102, 104, and 106 by using radio links (as shown by broken lines between the base stations 102, 104, and 106 and the terminal devices 108, 110, 112, 114, 116, 118, 120, and 122).

The base stations 102, 104, and 106 are configured to provide wireless access services for the terminal devices 108, 110, 112, 114, 116, 118, 120, and 122. Specifically, each base station corresponds to a service coverage area (which may also be referred to as a cell, as shown by elliptical areas in FIG. 1). A terminal device that enters the area may communicate with a base station by using a radio signal, to receive a wireless access service provided by the base station. Service coverage areas of the base stations may overlap. A terminal device in an overlapping area may receive radio signals from a plurality of base stations. Therefore, the plurality of base stations may serve the terminal device at the same time. For example, the plurality of base stations may serve the terminal device in the overlapping area by using a coordinated multipoint transmission/reception (CoMP) technology. For example, as shown in FIG. 1, service coverage areas of the base station 102 and the base station 104 overlap, and the terminal device 112 is located in an overlapping area. Therefore, the terminal device 112 may receive radio signals from the base station 102 and the base station 104, and the base station 102 and the base station 104 may serve the terminal device 112 at the same time. For another example, as shown in FIG. 1, service coverage areas of the base station 102, the base station 104, and the base station 106 have a common overlapping area, and the terminal device 120 is located in the overlapping area. Therefore, the terminal device 120 may receive radio signals from the base stations 102, 104, and 106, and the base stations 102, 104, and 106 may serve the terminal device 120 at the same time.

Depending on a used wireless communications technology, a base station may also be referred to as a NodeB, an evolved NodeB (eNodeB), an access point (AP), and the like. In addition, based on a size of a provided service coverage area, a base station may also be categorized into a macro base station that is configured to provide a macro cell, a micro base station that is configured to provide a micro cell, and a femto base station that is configured to provide a femto cell. With continuous evolution of the wireless communications technology, a future base station may also use another name.

The terminal devices 108, 110, 112, 114, 116, 118, 120 and 122 may be various wireless communications devices that have a wireless communication function, for example but not limited to, a mobile cellular phone, a cordless phone, a personal digital assistant (PDA), a smartphone, a notebook computer, a tablet computer, a wireless data card, a wireless modem (Modem), or a wearable device such as a smartwatch. As an Internet of Things (JOT) technology rises, an increasing quantity of devices previously having no communication function, for example but not limited to, a household appliance, a transport vehicle, an instrument device, a service device, and a service facility, start to obtain a wireless communication function with a wireless communications unit being configured, so that the devices may access a wireless communications network and be remotely controlled. This type of device has the wireless communication function because the wireless communications unit is configured for this type of device, and therefore this type of device also belongs to wireless communications devices. In addition, the terminal devices 108, 110, 112, 114, 116, 118, 120 and 122 may also be referred to as mobile stations, mobile devices, mobile terminals, wireless terminals, handheld devices, clients, or the like.

A plurality of antennas may be configured on each of the base stations 102, 104, and 106 and the terminal devices 108, 110, 112, 114, 116, 118, 120, and 122, so that the base stations and the terminal devices support a MIMO (technology. Further, the terminal devices 108, 110, 112, 114, 116, 118, 120, and 122 may support both a single-user MIMO (SU-MIMO) technology and a multi-user MIMO (MU-MIMO) technology. The MU-MIMO technology may be implemented based on a space division multiple access (Space Division Multiple Access, SDMA) technology. With the plurality of antennas being configured, the base stations 102, 104, and 106 and the terminal devices 108, 110, 112, 114, 116, 118, 120, and 122 may further flexibly support a single-input single-output (SISO) technology, a single-input multiple-output (SIMO) technology, and a multiple-input single-output (MISO) technology to implement various diversity technologies (for example but not limited to, transmit diversity and receive diversity) and multiplexing technologies. The diversity technology may include but is not limited to a transmit diversity (TD) technology and a receive diversity (RD) technology. The multiplexing technology may be a spatial multiplexing technology. In addition, the foregoing technologies may further include a plurality of implementation solutions. For example, currently frequently used transmit diversity may include, for example but not limited to, a diversity manner such as space-time transmit diversity (STTD), space-frequency transmit diversity (SFTD), time switched transmit diversity (TSTD), frequency switched transmit diversity (FSTD), orthogonal transmit diversity (OTD), cyclic delay diversity (CDD), and a diversity manner obtained by deriving from, evolving, and combining the foregoing diversity manners. For example, currently, transmit diversity manners such as space time block coding STBC), space frequency block coding (SFBC), and CDD are used in an Long Term Evolution (LTE) standard.

In addition, the base station 102 and the terminal devices 108, 110, 112, 120, and 122 may communicate by using various wireless communications technologies, for example but not limited to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an orthogonal Frequency Division Multiple Access (OFDMA) technology, a single carrier Frequency Division Multiple Access (SC-FDMA) technology, a Space Division Multiple Access (SDMA) technology, and a technology that evolves and derives from these technologies. The foregoing wireless communications technologies are used in many wireless communications standards as radio access technologies (RAT), to construct various wireless communications systems (or networks) that are nowadays widely known by people, including but not limited to Global System for Mobile Communications (GSM), CDMA 2000, Wideband CDMA (WCDMA), WiFi defined in the 802.11 series of standards, Worldwide Interoperability for Microwave Access (WiMAX), LTE, LTE-Advanced (LTE-A), and a system evolving from the wireless communications systems. The wireless communications network 100 shown in FIG. 1 may be any system or network of the foregoing wireless communications systems. Unless otherwise specified, the technical solution provided in this embodiment of the present application may be applied to the wireless communications technologies and the wireless communications systems. In addition, terms "system" and "network" can be interchanged with each other.

It should be noted that the wireless communications network 100 shown in FIG. 1 is merely used as an example and is not intended to limit the technical solutions of the present application. A person skilled in the art should understand that in a specific implementation process, the wireless communications network 100 further includes another device, for example but not limited to, a base station controller (BSC). In addition, a quantity of base stations and a quantity of terminal devices may be configured based on a specific requirement.

Usually, in a communication process, a receive device determines a channel matrix based on a reference signal transmitted by a transmit device, determines a precoding matrix based on the channel matrix and a codebook, and feeds back the precoding matrix to the transmit device. The transmit device precodes to-be-transmitted data based on the precoding matrix and sends precoded data to the receive device. In this specification, the receive device may be the terminal device 108, 110, 112, 114, 116, 118, 120, or 122 shown in FIG. 1, and the transmit device may be the base station 102, 104, and 106 shown in FIG. 1. Alternatively, the receive device may be the base station 102, 104, or 106 shown in FIG. 1, and the transmit device may be the terminal device 108, 110, 112, 114, 116, 118, 120, or 122 shown in FIG. 1. The embodiments of the present application provide parameter indication and determining methods, a corresponding receive device, and a corresponding transmit device. The following describes in detail the technical solutions provided in the embodiments of the present application.

Figure 2:
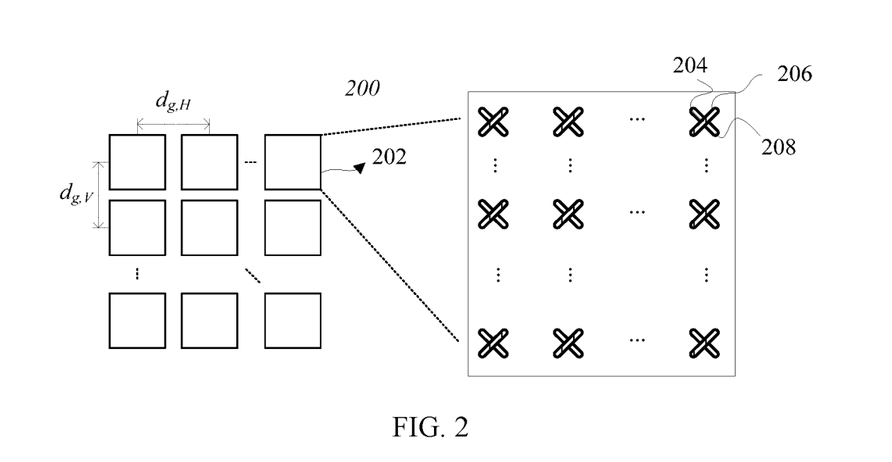
FIG. 2 is an example schematic diagram of an antenna panel according to an embodiment of the present application.

FIG. 2 is an example schematic diagram of an antenna panel 200 according to an embodiment of the present application. As shown in FIG. 2, the antenna panel 200 includes a plurality of antenna panels 202, and the antenna panels 202 are uniformly arranged on a rectangular plane. $d_{g,H}$ indicates a uniform distance between two antenna panels 202 in a horizontal direction, and $d_{g,V}$ indicates a uniform distance between two antenna panels 202 in a verticaldirection. An antenna panel 202 includes a plurality of array elements 204, and the array elements 204 are arranged in a manner of a matrix. Specifically, each row of the matrix includes a plurality of array elements 204, and each column includes a plurality of array elements 204. Each array element 204 includes two antennas, which are respectively an antenna 206 that works in a first polarization direction and an antenna 208 that works in a second polarization direction.

In an actual communication process, due to a relative relationship between a carrier frequency wavelength and an antenna panel distance, the plurality of antenna panels 202 shown in FIG. 2 may be considered as a unified non-uniform array, and when channel information is fed back, amplitude error information and phase error information between antenna panels need to be considered for the non-uniform array. The technical solutions provided in the embodiments of the present application are described in detail below with reference to FIG. 2.

Figure 3:
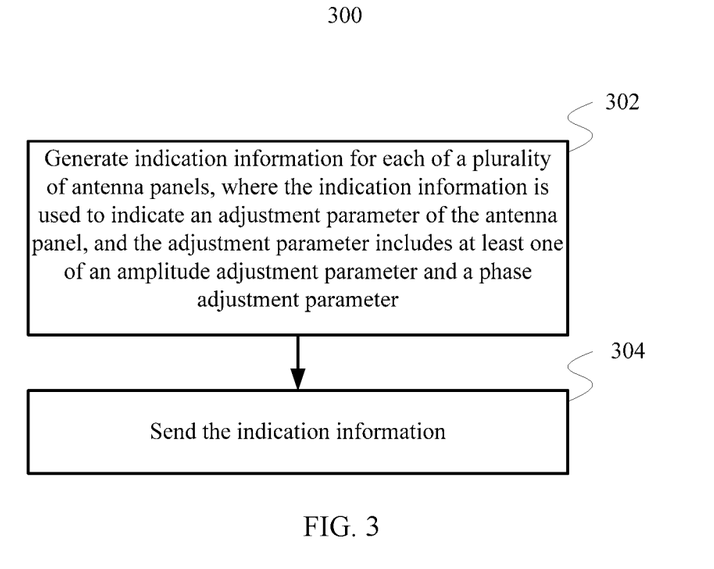
FIG. 3 is an example flowchart of a parameter indication method according to an embodiment of the present application.

FIG. 3 is a flowchart of a parameter indication method 300 according to an embodiment of the present application. In a specific implementation process, the method 300 may be performed by a receive device.

Step 302: Generate indication information for each of a plurality of antenna panels, where the indication information is used to indicate an adjustment parameter of the antenna panel, and the adjustment parameter includes at least one of an amplitude adjustment parameter and a phase adjustment parameter.

Step 304: Send the indication information.

According to the parameter indication method provided in this embodiment of the present application, the indication information is generated and sent, where the indication information is used to indicate a parameter of each of the plurality of antenna panels, and the parameter includes at least one of an amplitude and a phase, so that a transmit device determines the parameter of the antenna panel corresponding to the indication information based on the indication information. In the technical solution provided in this embodiment of the present application, adjustment parameters of the plurality of antenna panels are fed back to adjust the plurality of antenna panels, so that a precoding vector constructed based on the plurality of antenna panels is more accurate.

In a possible design, the adjustment parameter of each antenna panel is generated based on a result of comparison between channel information corresponding to the antenna panel and channel information corresponding to a reference antenna panel.

In a specific implementation process, the adjustment parameter may be an amplitude error and a phase error of each antenna panel relative to the reference antenna panel. The channel information corresponding to each antenna panel is channel information of a channel between the antenna panel and a terminal device, and the channel information corresponding to the reference antenna panel is channel information of a channel between the reference antenna panel and the terminal device. The channel information may be channel information of a channel between an antenna port on the antenna panel and the terminal device. For example (for ease of description, each antenna panel in the foregoing is referred to as an $n^{th}$ antenna panel in the following), an antenna port is selected from the reference antenna panel, and channel information that is of a channel between the antenna port and the receive device and that is measured on the antenna port is used as the channel information of the reference antenna panel. Likewise, an antenna port is selected from the $n^{th}$ antenna panel, and the antenna port may be, for example but not limited to, an antenna port corresponding to the antenna port selected from the reference antenna panel (for example, in a same location on the antenna panel). Channel information that is of a channel between the antenna port and the receive device and that is measured on the antenna port is used as the channel information of the antenna panel. An amplitude error and a phase error of the $n^{th}$ antenna panel relative to the reference antenna panel are determined based on the channel information measured on the two antenna ports. For example, the antenna panel 202 shown in FIG. 2 is a 4×4 antenna array. An antenna port on the reference antenna panel is selected. Measured by using a reference signal, channel information corresponding to the antenna port is $h_1=\gamma_1 e^{j\Phi_1}$. Likewise, an antenna port on the $n^{th}$ antenna panel is selected. Measured by using a reference signal, channel information corresponding to the antenna port is $h_n=\gamma_n e^{j\Phi_n}$. The amplitude error of the $n^{th}$ antenna panel relative to the reference antenna panel may be indicated as $\gamma_n/\gamma_1$, and the phase error of the $n^{th}$ antenna panel relative to the reference antenna panel may be indicated as $\phi_n-\phi_1$ or $e^{j(\Phi_n-\Phi_1)}$. An adjustment parameter of the $n^{th}$ antenna panel, namely, the adjustment parameter of each antenna panel, may be generated based on the amplitude error and the phase error of the $n^{th}$ antenna panel relative to the reference antenna panel.

In a possible design, the adjustment parameter of each antenna panel is used to adjust the antenna panel when the antenna panel is combined with another antenna panel. That the antenna panel is combined with another antenna panel means that the antenna panels serve same terminal users. For example, a panel 1 and a panel 2 together serve a terminal 1 (SU-MIMO), or together serve a terminal 1 and a terminal 2 (MU-MIMO). A transmit signal of each antenna on the antenna panel is adjusted by using the adjustment parameter of each antenna panel. The adjustment may be specifically expressed as adjustment of a codebook of each antenna panel that participates in combination. In the prior art, the codebook may be expressed in the following form:

$$W = W_1 W_2$$

$W_1$ may be referred to as a long-term/wideband codebook, and $W_2$ may be referred to as a short-term/narrowband codebook. For example, when a precoding vector of each antenna panel is constructed, the adjustment parameter is weighted to the foregoing $W_1$ $W_2$. For another technical feature of the $W_1$ $W_2$ codebook, refer to the prior art. Details are not described herein. With reference to the foregoing $W_1$ $W_2$ expression form, the adjustment parameter may be expressed in a form of a $W_3$ codebook. In this case, the following is an example:

$$W_3 = \begin{bmatrix} \beta_1 & \cdots & 0 \\ \vdots & \ddots & \vdots \\ 0 & \cdots & \beta_N \end{bmatrix}$$

$$\beta_n = \tilde{\beta}_n \otimes I_n$$

$\otimes$ indicates a Kronecker product, and $I_n$ is a unit matrix. $\tilde{\beta}_n = \gamma_n e^{j\phi_n}$. $\gamma_n \in \{x_1, x_2, \ldots, x_N\}$, where $x_n$ indicates an amplitude value, N is a positive integer, and $1 \le n \le N$. $e^{j\phi_n} \in \{e^{j\phi_1}, e^{j\phi_2}, \ldots, e^{j\phi_N}\}$, where $e^{j\phi_n}$ indicates a phase value, N is a positive integer $1 \le n \le N$, and $0 \le \phi_n \le 2\pi$ or $-\pi \le \phi_n \le \pi$.

In a possible design, a value of the amplitude adjustment parameter is selected from an amplitude value set, and a value of the phase adjustment parameter is selected from a phase value set. In a specific implementation process, the amplitude adjustment parameter may be the amplitude error of each antenna panel relative to the reference antenna panel, and the phase adjustment parameter may be the phase error of each antenna panel relative to the reference antenna panel. To be specific, a value of the amplitude error is selected from a preset amplitude value set, and a value index of the amplitude error is fed back; and a value of the phase error is selected from a preset phase value set, and a value index of the phase error is fed back. For example, the amplitude value set may be defined as $\gamma_n \in \{x_1, x_2, \ldots x_N\}$, where $x_n$ indicates an amplitude value. $i_n$ indicates an index of the amplitude value $x_n$. $i_n \in \{1\ 2\ \ldots\ N\}$, where N is a positive integer, and $1 \le n \le N$. In this case, amplitude error information that is fed back is an index corresponding to a value of $\gamma_n / \gamma_1$, and $\lceil \log_2(N) \rceil$ bits are occupied to feed back the amplitude error information. Specifically, the amplitude value set may be defined as $\gamma_n \in \{1\ \sqrt{0.5}\ \sqrt{0.25}\ 0\}$. In this case, N=4, and each $i_n$ occupies two bits. The phase value set may be defined as $\phi_m \in \{y_1, y_2, \ldots y_M\}$, where $y_m$ indicates a phase value, and $0 \le y_m \le 2\pi$ or $-\pi \le y_m \le \pi$. $p_m$ indicates an index of the phase value $y_m$. $p_m \in \{1\ 2\ \ldots\ M\}$, where M is a positive integer, and $1 \le m \le M$. In this case, phase error information that is fed back is an index corresponding to a value of $\phi_n - \phi_1$, and $\lceil \log_2(M) \rceil$ bits are occupied to feed back the phase error information. Specifically, the phase value set may be defined as $$\phi_m \in \left\{0\ \frac{\pi}{2}\ \pi\ \frac{3\pi}{2}\right\}.$$

In this case, M=4, and each $p_m$ occupies two bits. It should be noted that the phase value set may alternatively be defined as $e^{j\phi_m} \in \{e^{j\phi_1}, e^{j\phi_2}, \ldots, e^{j\phi_M}\}$, where $e^{j\phi_m}$ indicates a phase value, M is a positive integer, $1 \le m \le M$, and $0 \le \phi_m \le 2\pi$ or $-\pi \le \phi_m \le \pi$. $p_m$ indicates an index of the phase value $e^{j\phi_m}$, and $p_m \in \{1\ 2\ \ldots\ M\}$. Specifically, the phase value set may be defined as $e^{j\phi_m} \in \{1, j, -1, j\}$. It may be understood that in this case, $e^{j\phi_m}$ is an expression form of the phase value, and a specific phase change is $\phi_m$, where $0 \le \phi_m \le 2\pi$ or $-\pi \le \phi_m \le \pi$. It should be further noted that when the value of the amplitude error is selected from the amplitude value set and the value of the phase error is selected from the phase value set, an amplitude value that is closest to the value of the amplitude error may be selected as the value of the amplitude error, and likewise, a phase value that is closest to the value of the phase error may be selected as the value of the phase error. For a specific selection operation, refer to a description in the prior art. Details are not described herein.

In a possible design, the indication information is sent by using a precoding matrix indicator.

In a possible design, the $W_3$ codebook may be used to feed back channel information corresponding to the plurality of antenna panels. In this case, a precoding matrix corresponding to the plurality of antenna panels may be expressed in the following form:

$$W = W_3 W_1 W_2 = \begin{bmatrix} \beta_1 & \cdots & 0 \\ \vdots & \ddots & \vdots \\ 0 & \cdots & \beta_N \end{bmatrix} \begin{bmatrix} W_1^1 & \cdots & 0 \\ \vdots & \ddots & \vdots \\ 0 & \cdots & W_1^N \end{bmatrix} \begin{bmatrix} W_2^1 \\ W_2^2 \\ \vdots \\ W_2^N \end{bmatrix} = \begin{bmatrix} \beta_1 W_1^1 W_2^1 \\ \beta_2 W_1^2 W_2^2 \\ \vdots \\ \beta_N W_1^N W_2^N \end{bmatrix},$$

where $$W_3 = \begin{bmatrix} \beta_1 & \cdots & 0 \\ \vdots & \ddots & \vdots \\ 0 & \cdots & \beta_N \end{bmatrix}; \text{or}$$

$$W_3 = \begin{bmatrix} \beta_1 & \cdots & 0 \\ \vdots & \ddots & \vdots \\ 0 & \cdots & \beta_N \end{bmatrix} \otimes I_n$$

$\beta_n$ indicates an adjustment parameter of an $n^{th}$ antenna panel, for example, an amplitude phase feature. The amplitude phase feature may further be expressed as $\beta_n = \tilde{\beta}_n \otimes I_n$.

$\otimes$ indicates a Kronecker product, and $I_n$ is a unit matrix. $\tilde{\beta}_n$ indicates an amplitude phase feature factor, and $\tilde{\beta}_n = \gamma_n e^{j\phi_n}$, where $\gamma_n$ is an amplitude part of the amplitude phase feature factor, and $e^{j\phi_n}$ is a phase part of the amplitude phase feature factor.

$$W_1 W_2 = \begin{bmatrix} W_1^1 & \cdots & 0 \\ \vdots & \ddots & \vdots \\ 0 & \cdots & W_1^N \end{bmatrix} \begin{bmatrix} W_2^1 \\ W_2^2 \\ \vdots \\ W_2^N \end{bmatrix} = \begin{bmatrix} W_1^1 W_2^1 \\ W_1^2 W_2^2 \\ \vdots \\ W_1^N W_2^N \end{bmatrix}$$

$W_1^n W_2^n$ indicates a precoding matrix corresponding to the $n^{th}$ antenna panel. A $W_1^n W_2^n$ construction manner may be: $W_1^n$ includes at least one base (for example, a DFT vector), $W_2^n$ is at least one column vector, each column vector includes only one non-zero element, and the non-zero element may further be expressed as $e^{j\Theta_n}$.

Another $W_1^n W_2^n$ construction manner may be: $W_1^n$ includes at least one base (for example, a DFT vector), $W_2^n$ is at least one column vector, each column vector includes more than one non-zero element, and the non-zero element may further be expressed as $\alpha_n e^{j\Theta_n}$. $\alpha_n$ is amplitude information, and $\theta_n$ is phase information.

In a possible design, the $W_3$ codebook may be used to feed back channel information of the plurality of antenna panels. In this case, a precoding matrix of the plurality of antenna panels may be expressed in the following form:

$$W = W_1 W_2 W_3 = \begin{bmatrix} W_1^1 W_2^1 & \cdots & 0 \\ \vdots & \ddots & \vdots \\ 0 & \cdots & W_1^N W_2^N \end{bmatrix} \begin{bmatrix} \beta_1 \\ \beta_2 \\ \vdots \\ \beta_N \end{bmatrix} = \begin{bmatrix} \beta_1 W_1^1 W_2^1 \\ \beta_2 W_1^2 W_2^2 \\ \vdots \\ \beta_N W_1^N W_2^N \end{bmatrix},$$

where $$W_1 W_2 = \begin{bmatrix} W_1^1 W_2^1 & \cdots & 0 \\ \vdots & \ddots & \vdots \\ 0 & \cdots & W_1^N W_2^N \end{bmatrix}$$

$$W_3 = \begin{bmatrix} \beta_1 \\ \beta_2 \\ \vdots \\ \beta_N \end{bmatrix}$$

$\beta_n$ indicates an adjustment parameter of an $n^{th}$ antenna panel, for example, an amplitude phase feature. The amplitude phase feature may further be expressed as $\beta_n = \bar{\beta}_n \otimes I_n$.

$\otimes$ indicates a Kronecker product, and $I_n$ is a unit matrix. $\bar{\beta}_n$ indicates an amplitude phase feature factor, and $\bar{\beta}_n = \gamma_n e^{j\Phi_n}$, where $\gamma_n$ is an amplitude part of the amplitude phase feature factor, and $e^{j\Phi_n}$ is a phase part of the amplitude phase feature factor.

$W_1^n W_2^n$ indicates a precoding matrix corresponding to the $n^{th}$ antenna panel. A $W_1^n W_2^n$ construction manner may be: $W_1^n$ includes at least one base (for example, a DFT vector), $W_2^n$ is at least one column vector, each column vector includes only one non-zero element, and the non-zero element may further be expressed as $e^{j\Theta_n}$.

Another $W_1^n W_2^n$ construction manner may be: $W_1^n$ includes at least one base (for example, a DFT vector), $W_2^n$ is at least one column vector, each column vector includes more than one non-zero element, and the non-zero element may further be expressed as $\alpha_n e^{j\Theta_n}$. $\alpha_n$ is amplitude information, and $\theta_n$ is phase information.

It can be learned that the channel information of the plurality of antenna panels may be indicated by using multi-level codebooks, including the $W_1$ codebook, the $W_2$ codebook, and the $W_3$ codebook. The codebooks may be fed back to the transmit device by using precoding matrix indicators (Precoding Matrix Indicator, PMI) corresponding to the $W_1$ codebook, the $W_2$ codebook, and the $W_3$ codebook. Specifically, information about $W_1$ may be carried by using a $PMI_{W_1}$, information about $W_2$ may be carried by using a $PMI_{W_2}$, and information about $W_3$ may be carried by using a $PMI_{W_3}$. It should be noted that the $PMI_{W_1}$ may indicate index information of at least one base vector selected from the $W_1$ codebook, and the at least one base vector may be from at least one $W_1^n$. The $PMI_{W_2}$ may indicate index information of at least one non-zero element selected from the $W_2$ codebook, and the at least one non-zero element may be from at least one $W_2^n$. The $PMI_{W_3}$ may indicate index information of at least one non-zero element selected from the $W_3$ codebook, and the at least one non-zero element may be from at least one $\beta_n$.

It should be noted that the foregoing $PMI_{W_1}$, $PMI_{W_2}$, and $PMI_{W_3}$ may be fed back at the same time, or may not be fed back at the same time. In other words, feedback periods of the $PMI_{W_1}$, $PMI_{W_2}$, and $PMI_{W_3}$ may be the same, or may be different. In addition, feedbacks of the foregoing $PMI_{W_1}$, $PMI_{W_2}$, and $PMI_{W_3}$ may be at least one of a periodic (periodic) feedback, a semi-persistent (semi-persistent) feedback, and an aperiodic (aperiodic) feedback.

It should be further noted that the foregoing $PMI_{W_1}$, $PMI_{W_2}$, and $PMI_{W_3}$ may be fed back in a same frequency band width, or may be fed back in different frequency band widths. The frequency band width includes at least one of a wideband (wideband), a partial band (partial band), and a subband (subband). For example, the foregoing $PMI_{W_1}$, $PMI_{W_2}$, and $PMI_{W_3}$ may all be fed back in the wideband, or may all be fed back in the partial band; or the $PMI_{W_1}$ may be fed back in the wideband, the $PMI_{W_2}$ may be fed back in the partial band, and the $PMI_{W_3}$ may be fed back in the subband. Feedback manners of the foregoing $PMI_{W_1}$, $PMI_{W_2}$, and $PMI_{W_3}$ may be specifically determined based on an actual requirement and are not limited herein.

In a specific implementation process, in step 304, the receive device sends the indication information to the transmit device by using determined signaling. It may be understood that the indication information may be a set of indication information corresponding to all antenna panels. To be specific, the indication information generated for all the antenna panels is together sent to the transmit device by using the determined signaling. The indication information may be sent by using one piece of the following signaling:
physical layer signaling;
media access control layer signaling; and
radio resource control signaling.

The physical layer signaling is also referred to as layer 1 (Layer 1, L1) signaling, and may usually be carried by a control part in a physical layer frame. A typical example of the L1 signaling is downlink control information (DCI) carried on a physical downlink control channel (PDCCH), which is defined in an LTE standard. In some cases, the L1 signaling may alternatively be carried by a data part in the physical layer frame. It is easily learned that a sending period or a signaling period of the L1 signaling is usually a period of the physical layer frame. Therefore, the signaling is usually used to implement some dynamic control to transfer some information that changes frequently. For example, resource allocation information may be transferred by using the physical layer signaling.

The media access control (MAC) layer signaling is layer 2 signaling, and may usually be carried by, for example but not limited to, a frame header of a layer 2 frame. The frame header may further carry, for example but not limited to, information such as a source address and a destination address. In addition to the frame header, the layer 2 frame usually further includes a frame body. In some cases, the L2 signaling may alternatively be carried by the frame body of the layer 2 frame. A typical example of the layer 2 signaling is signaling carried in a frame control field in a frame header of a MAC frame in the 802.11 series of standards, or a MAC control entity defined in some protocols. The layer 2 frame may usually be carried by the data part in the physical layer frame. The precoding configuration information may alternatively be sent by using layer 2 signaling other than the media access control layer signaling.

The radio resource control (RRC) signaling is layer 3 signaling, and is usually some control messages. The L3 signaling may usually be carried in the frame body of the layer 2 frame. A sending period or a control period of the L3 signaling is usually relatively long, and the L3 signaling is applicable to sending some information that does not change frequently. For example, in some existing communications standards, the L3 signaling is usually used to carry some configuration information. The precoding configuration information may alternatively be sent by using layer 3 signaling other than the RRC signaling.

The foregoing description is merely a principle description of the physical layer signaling, the MAC layer signaling, the RRC signaling, the layer 1 signaling, the layer 2 signaling, and the layer 3 signaling. For details about the three types of signaling, refer to the prior art, and therefore details are not described in this specification.

Figure 4:
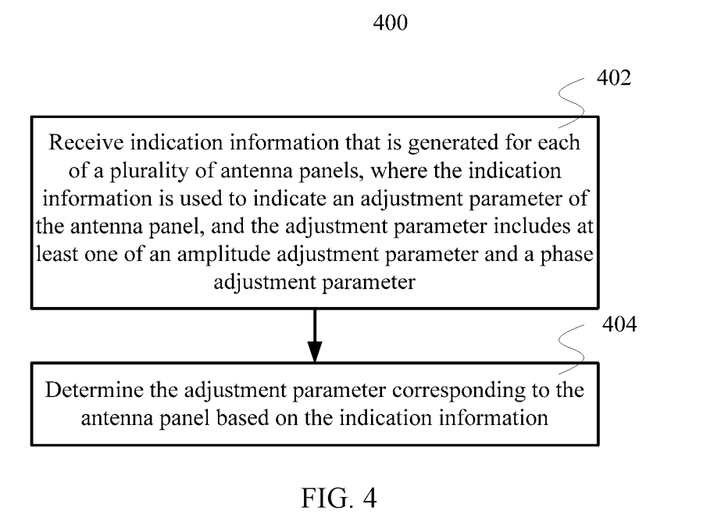
FIG. 4 is an example flowchart of a parameter determining method according to an embodiment of the present application.

FIG. 4 is a flowchart of a parameter determining method 400 according to an embodiment of the present application. In a specific implementation process, the method 400 may be performed by a transmit device.

Step 402: Receive indication information that is generated for each of a plurality of antenna panels, where the indication information is used to indicate an adjustment parameter of the antenna panel, and the adjustment parameter includes at least one of an amplitude adjustment parameter and a phase adjustment parameter.

Step 404: Determine the adjustment parameter corresponding to the antenna panel based on the indication information.

In a specific implementation process, the specific adjustment parameter may be determined by receiving the indication information and obtaining, through parsing, information about the adjustment parameter carried in the indication information.

Specific technical content related to the method 400 is clearly described above with reference to the accompanying drawings, for example but not limited to, the method 300 and FIG. 3, and therefore is not described herein again.

It can be learned that the indication information is received, where the indication information is used to indicate the adjustment parameter of each of the plurality of antenna panels, and the adjustment parameter includes at least one of the amplitude adjustment parameter and the phase adjustment parameter. The transmit device determines the adjustment parameter of the antenna panel corresponding to the indication information based on the indication information. In the technical solution provided in this embodiment of the present application, adjustment parameters of the plurality of antenna panels are determined to adjust the plurality of antenna panels, so that a precoding vector constructed based on the plurality of antenna panels is more accurate.

Figure 5:
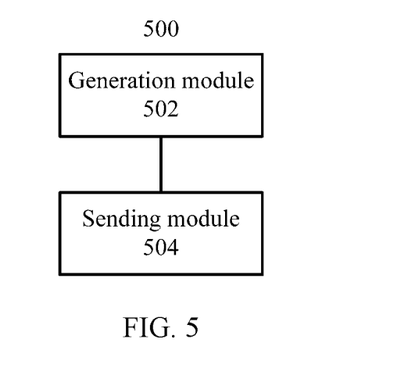
FIG. 5 is a schematic diagram of a logical structure of a receive device according to an embodiment of the present application.

FIG. 5 is a schematic diagram of a logical structure of a receive device 500 according to an embodiment of the present application. As shown in FIG. 5, the device 500 includes a generation module 502 and a sending module 504.

The generation module 502 is configured to generate indication information for each of a plurality of antenna panels, where the indication information is used to indicate an adjustment parameter of the antenna panel, and the adjustment parameter includes at least one of an amplitude adjustment parameter and a phase adjustment parameter.

The sending module 504 is configured to send the indication information.

The device 500 is configured to perform the method 300 shown in FIG. 3. A technical feature related to the device 500 is described in detail above with reference to the accompanying drawings, for example but not limited to, the method 300 and FIG. 3, and therefore is not described herein again.

Figure 6:
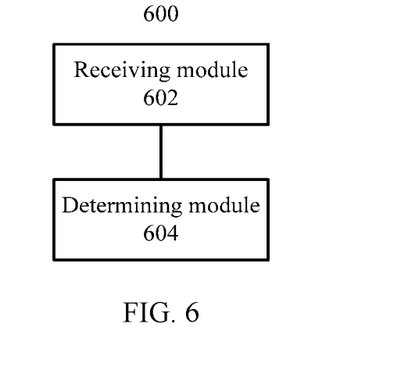
FIG. 6 is a schematic diagram of a logical structure of a transmit device according to an embodiment of the present application.

FIG. 6 is a schematic diagram of a logical structure of a transmit device 600 according to an embodiment of the present application. As shown in FIG. 6, the device 600 includes a receiving module 602 and a determining module 604.

The receiving module 602 is configured to receive indication information that is generated for each of a plurality of antenna panels, where the indication information is used to indicate an adjustment parameter of the antenna panel, and the adjustment parameter includes at least one of an amplitude adjustment parameter and a phase adjustment parameter.

The determining module 604 is configured to determine the adjustment parameter corresponding to the antenna panel based on the indication information.

The device 600 is configured to perform the method 400 shown in FIG. 4. A technical feature related to the device 600 is described in detail above with reference to the accompanying drawings, for example but not limited to, the method 400 and FIG. 4, and therefore is not described herein again.

Figure 7:
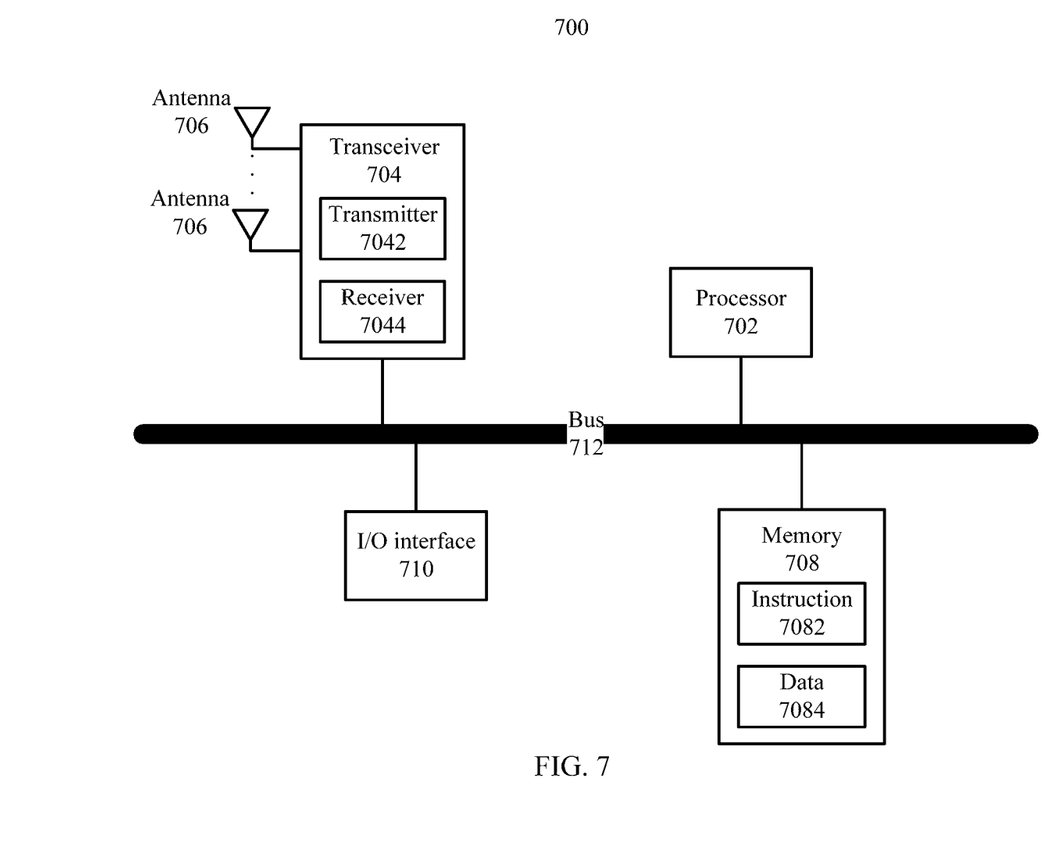
FIG. 7 is a schematic diagram of a hardware structure of a receive device according to an embodiment of the present application.

FIG. 7 is a schematic diagram of a hardware structure of a receive device 700 according to an embodiment of the present application. As shown in FIG. 7, the device 700 includes a processor 702, a transceiver 704, a plurality of antennas 706, a memory 708, an input/output (I/O) interface 710, and a bus 712. The transceiver 704 further includes a transmitter 7042 and a receiver 7044, and the memory 708 is further configured to store an instruction 7082 and data 7084. In addition, the processor 702, the transceiver 704, the memory 708, and the I/O interface 710 are communicatively connected to each other by using the bus 712, and the plurality of antennas 706 are connected to the transceiver 704.

The processor 702 may be a general purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 702 may alternatively be a combination of a plurality of processors. In particular, in the technical solution provided in this embodiment of the present application, the processor 702 may be configured to perform, for example, step 302 in the parameter indication method 300 shown in FIG. 3 and the operation performed by the generation module 502 in the receive device 500 shown in FIG. 5. The processor 702 may be a processor that is specially designed to perform the foregoing steps and/or operations, or may be a processor that reads and executes the instruction 7082 stored in the memory 708 to perform the foregoing steps and/or operations. The processor 702 may need to use the data 7084 when performing the foregoing steps and/or operations.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. In particular, in the technical solution provided in this embodiment of the present application, the transmitter 7042 may be specifically configured to use at least one of the plurality of antennas 706 to perform, for example, step 304 in the parameter indication method 300 shown in FIG. 3 and the operation performed by the sending module 504 in the receive device 500 shown in FIG. 5.

The memory 708 may be various types of storage media, for example, a random access memory (RAM), a read-only memory (ROM), a nonvolatile RAM (NVRAM), a programmable ROM (PROM), an erasable PROM (EPROM), an electrically erasable PROM (EEPROM), a flash memory, an optical memory, and a register. The memory 708 is specifically configured to store the instruction 7082 and the data 7084. The processor 702 may read and execute the instruction 7082 stored in the memory 708 to perform the foregoing steps and/or operations, and may need to use the data 7084 when performing the foregoing steps and/or operations.

The I/O interface 710 is configured to receive an instruction and/or data from a peripheral device, and output an instruction and/or data to the peripheral.

It should be noted that in a specific implementation process, the device 700 may further include another hardware component, which is not listed one by one herein again.

Figure 8:
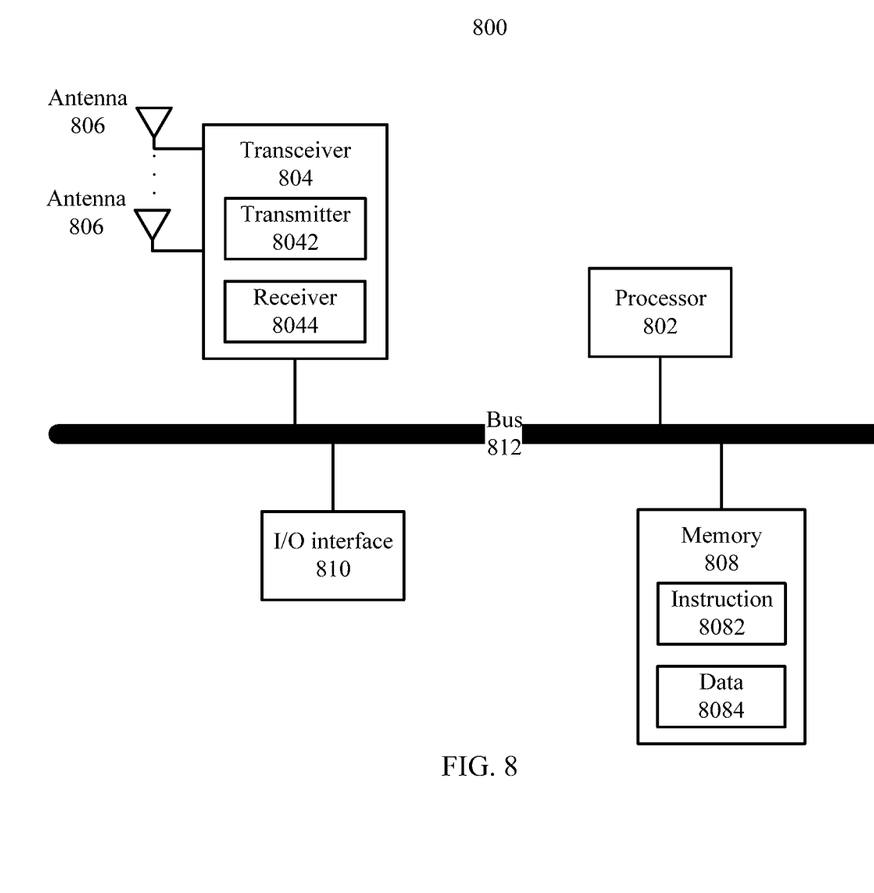
FIG. 8 is a schematic diagram of a hardware structure of a transmit device according to an embodiment of the present application.

FIG. 8 is a schematic diagram of a hardware structure of a transmit device 800 according to an embodiment of the present application. As shown in FIG. 8, the device 800 includes a processor 802, a transceiver 804, a plurality of antennas 806, a memory 808, an I/O interface 810, and a bus 812. The transceiver 804 further includes a transmitter 8042 and a receiver 8044, and the memory 808 is further configured to store an instruction 8082 and data 8084. In addition, the processor 802, the transceiver 804, the memory 808, and the I/O interface 810 are communicatively connected to each other by using the bus 812, and the plurality of antennas 806 are connected to the transceiver 804.

The processor 802 may be a general purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 802 may alternatively be a combination of a plurality of processors. In particular, in the technical solution provided in this embodiment of the present application, the processor 802 is configured to perform, for example, step 404 in the parameter determining method 400 shown in FIG. 4 and the operation performed by the determining module 604 in the transmit device 600 shown in FIG. 6. The processor 802 may be a processor that is specially designed to perform the foregoing steps and/or operations, or may be a processor that reads and executes the instruction 8082 stored in the memory 808 to perform the foregoing steps and/or operations. The processor 802 may need to use the data 8084 when performing the foregoing steps and/or operations.

The transceiver 804 includes the transmitter 8042 and the receiver 8044. The transmitter 8042 is configured to send a signal by using at least one of the plurality of antennas 806. The receiver 8044 is configured to receive a signal by using at least one of the plurality of antennas 806. In particular, in the technical solution provided in this embodiment of the present application, the receiver 8044 may be specifically configured to use at least one of the plurality of antennas 806 to perform, for example, step 402 in the parameter determining method 400 shown in FIG. 4 and the operation performed by the receiving module 602 in the transmit device 600 shown in FIG. 6.

The memory 808 may be various types of storage media, for example, aRAM, a ROM, a NVRAM, PROM, an EPROM, anEEPROM, a flash memory, an optical memory, and a register. The memory 808 is specifically configured to store the instruction 8082 and the data 8084. The processor 802 may read and execute the instruction 8082 stored in the memory 808 to perform the foregoing steps and/or operations, and may need to use the data 8084 when performing the foregoing steps and/or operations.

The I/O interface 810 is configured to receive an instruction and/or data from a peripheral device, and output an instruction and/or data to the peripheral.

It should be noted that in a specific implementation process, the device 800 may further include another hardware component, which is not listed one by one herein again.

The foregoing descriptions are merely some embodiments of the present application, but are not intended to limit the scope of the present application. Any modification, equivalent replacement, and improvement made without departing from the spirit and principle of the present application shall fall within the protection scope of the present application. For example, adding another processing step before, between, and/or after the methods provided in the embodiments of the present application, adding another processing module in the apparatuses provided in the embodiments of the present application to complete additional processing, and applying the technical solutions provided in the embodiments of the present application in a particular scenario or in a particular condition should be all considered as further improvement based on the technical solutions provided in the embodiments of the present application and therefore all fall within the scope of the present application.

It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a ROM, aRAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A parameter indication method, wherein the method comprises:
    generating indication information for each of a plurality of antenna panels, wherein:
    the indication information is used to indicate an adjustment parameter of the antenna panel;
    the adjustment parameter comprises at least one of an amplitude adjustment parameter or a phase adjustment parameter; and
    the adjustment parameter of the antenna panel is generated based on a result of comparison between channel information corresponding to the antenna panel and channel information corresponding to a reference antenna panel; and
    sending the indication information.

2. The method according to claim 1, wherein the adjustment parameter is used to adjust the antenna panel corresponding to the adjustment parameter when the antenna panel is combined with another antenna panel.

3. The method according to claim 1, wherein a value of the amplitude adjustment parameter is selected from an amplitude value set.

4. The method according to claim 1, wherein a value of the phase adjustment parameter is selected from a phase value set.

5. A parameter determining method, wherein the method comprises:
    receiving indication information that is generated for each of a plurality of antenna panels, wherein:
    the indication information is used to indicate an adjustment parameter of the antenna panel;
    the adjustment parameter comprises at least one of an amplitude adjustment parameter or a phase adjustment parameter; and
    the adjustment parameter of the antenna panel is generated based on a result of comparison between channel information corresponding to the antenna panel and channel information corresponding to a reference antenna panel; and
    determining the adjustment parameter corresponding to the antenna panel based on the indication information.

6. The method according to claim 5, wherein the adjustment parameter is used to adjust the antenna panel corresponding to the adjustment parameter when the antenna panel is combined with another antenna panel.

7. The method according to claim 5, wherein a value of the amplitude adjustment parameter is selected from an amplitude value set.

8. The method according to claim 5, wherein a value of the phase adjustment parameter is selected from a phase value set.

9. A receive device, wherein the receive device comprises:
    a processor, configured to generate indication information for each of a plurality of antenna panels, wherein:
    the indication information is used to indicate an adjustment parameter of the antenna panel;
    the adjustment parameter comprises at least one of an amplitude adjustment parameter or a phase adjustment parameter; and
    the adjustment parameter of the antenna panel is generated based on a result of comparison between channel information corresponding to the antenna panel and channel information corresponding to a reference antenna panel; and
    a transmitter, configured to send the indication information.

10. The receive device according to claim 9, wherein the adjustment parameter is used to adjust the antenna panel corresponding to the adjustment parameter when the antenna panel is combined with another antenna panel.

11. The receive device according to claim 9, wherein a value of the amplitude adjustment parameter is selected from an amplitude value set.

12. The receive device according to claim 9, wherein a value of the phase adjustment parameter is selected from a phase value set.

13. A transmit device, wherein the transmit device comprises:
    a receiver, configured to receive indication information that is generated for each of a plurality of antenna panels, wherein:
    the indication information is used to indicate an adjustment parameter of the antenna panel;
    the adjustment parameter comprises at least one of an amplitude adjustment parameter or a phase adjustment parameter; and
    the adjustment parameter of the antenna panel is generated based on a result of comparison between channel information corresponding to the antenna panel and channel information corresponding to a reference antenna panel; and a processor, configured to determine the adjustment parameter corresponding to the antenna panel based on the indication information.

14. The transmit device according to claim 13, wherein the adjustment parameter is used to adjust the antenna panel corresponding to the adjustment parameter when the antenna panel is combined with another antenna panel.

15. The transmit device according to claim 13, wherein a value of the amplitude adjustment parameter is selected from an amplitude value set.

16. The transmit device according to claim 13, wherein a value of the phase adjustment parameter is selected from a phase value set.

* * * * *